United States Patent Office 3,211,853
Patented Oct. 12, 1965

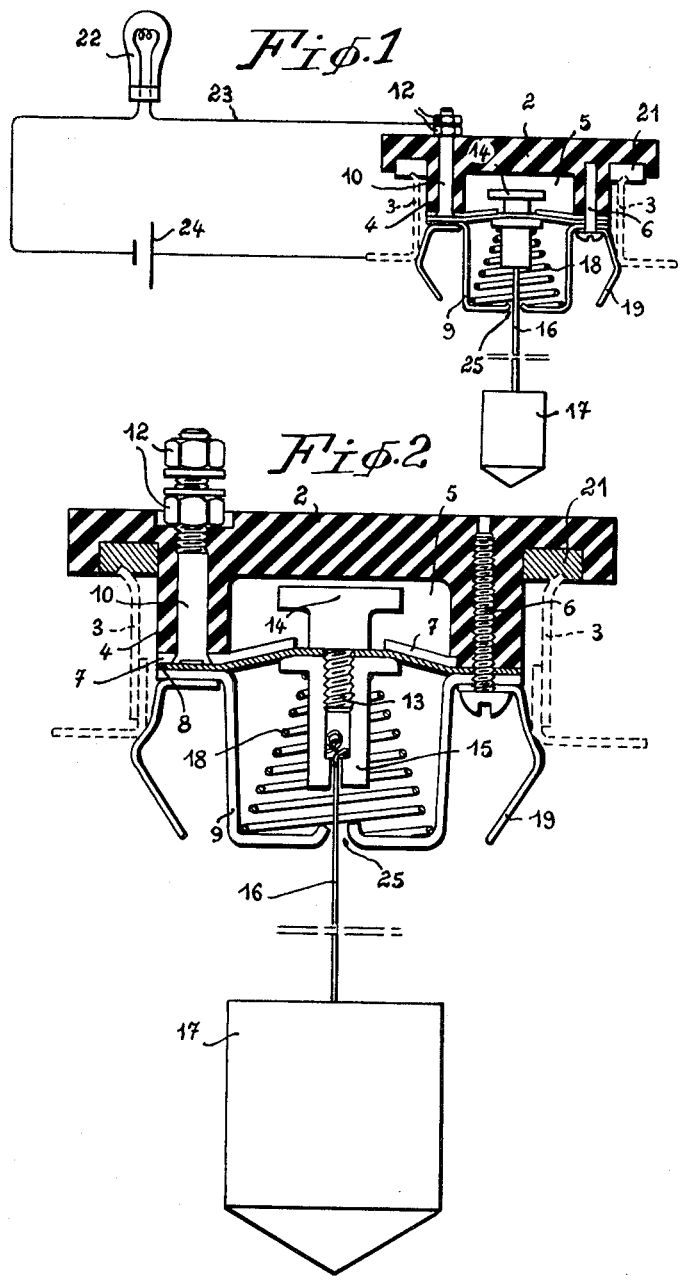

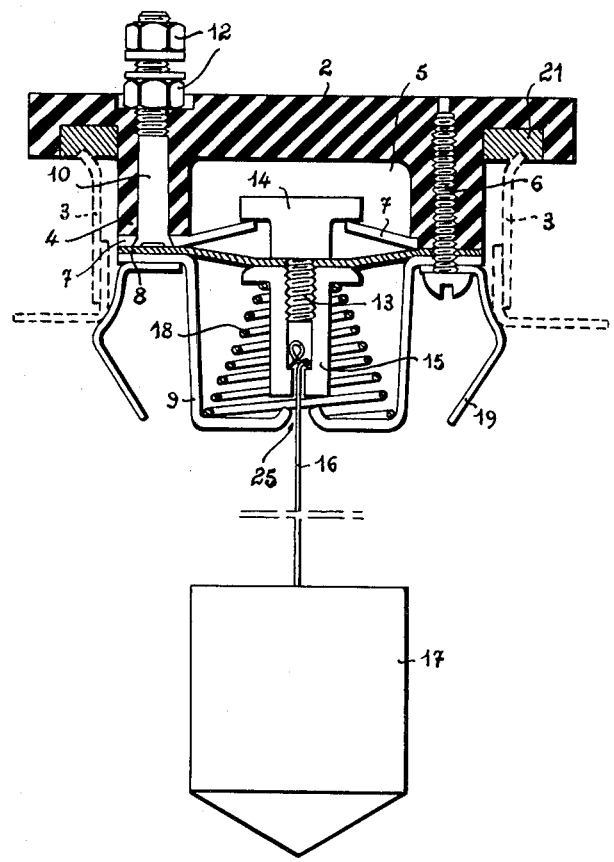

3,211,853
DIAPHRAGM MOUNTED FLOAT OPERATED SWITCH FOR INSERTION INTO GASOLINE TANKS
Paul Francis Le Corvoisier, Rue Pierre Curie, Villefranche-sur-Saone, Rhone, France
Filed May 20, 1960, Ser. No. 30,559
Claims priority, application France, May 27, 1959, 39,446, Patent 1,225,457
5 Claims. (Cl. 200—84)

The present invention relates to float switches and more particularly to a compact switch of this character which is combined with the cap for the fuel tank of a motorcycle or other automotive vehicle or of any other internal combustion engine.

Briefly, the float switch comprises a switch or contact-maker, the movable contact-piece or contact member of which is secured directly to and guided by a yielding and fluidtight flexible insulating diaphragm defining with the insulating body of the switch a fluidtight chamber inside which are housed said movable contact-piece and the cooperating stationary contact-piece. The insulating diaphragm and the movable contact-piece thereon forming the movable section of the switch are subjected in one direction to the action of a connection transmitting the weight of a float, and in the opposite direction, to the action of a spring which serves as an electric lead and balances the reaction of the diaphragm, together with the weight of the movable contact-piece and the weight of the connection.

Said spring is gauged in a manner such that its power may be just sufficient for holding the contact-pieces apart when the float is carried by the liquid. When the float no longer floats on the liquid, its weight, transmitted by the connection, compresses the spring and closes the switch.

When applied to gasoline tanks of vehicles, particularly motorcycles, the insulating body of the gauge may form the plug or removable cap closing the port through which the container is filled and the connection between the movable section of the switch and the float may be constituted by an electrically conductive spring member.

The invention will be readily understood upon reading of the following description of a preferred embodiment, as applied to a fuel tank for a motorcycle. In the accompanying drawings illustrating said embodiment:

FIG. 1 is a circuit diagram including a sectional elevational view of the switch.

FIGS. 2 and 3 are enlarged sectional views of the switch of FIG. 1 positioned to correspond to a tank sufficiently filled with fuel and to a tank wherein the amount of fuel has sunk to a minimum.

In the drawings, 2 designates the insulating body of the gauge forming the plug or removable cap closing the filling port of the tank containing the gasoline supply for a motorcycle (not shown), said port being shown in broken lines at 3. The insulating body 2 includes a skirt 4 defining a cylindrical chamber 5. An annular metal plate 7 forming the stationary contact-piece, a yielding, electrically insulating and fluidtight diaphragm 8 and a metal cup 9 are secured by a circle of screws 6 to the lower edge of said skirt 4. Only one of the screws 6 is visible in the drawing.

The metal plate 7 is provided with a central aperture, the diameter of which is sufficiently large, so as to avoid any possibility of a lateral contact between it and the movable contact-piece 14. The annular stationary contact plate 7 is rigid with a terminal screw 10, the head of which is embedded inside said plate, while its shank extends upwardly through the skirt 4 and the body 2 of the plug, above which it carries two nuts 12 which allow it to serve as a terminal feeding the stationary contact-piece plate 7. The screws 6 are spaced with reference to the plate 7 and are electrically insulated therefrom by the body 2 of the switch.

The diaphragm 8, which is clamped between the plate 7 and the upper flange portion of the cup 9, is provided with a small-sized central port through which passes the threaded shank section 13 rigid with the movable contact-piece 14. Said threaded shank 13 is screwed into a support 15 located underneath the diaphragm 8, of which the central section is thus clamped fluidtightly between the head or contact-piece 14 and the support 15.

Said support 15 is connected to a loosely fitting connecting member 16 from which is suspended a float 17 removably disposed in the gasoline tank, the diameter of said float being sufficiently small for it to pass through the filling port of the tank.

A spring 18, accurately stressed to a value immediately above the value balancing exactly the reaction of the diaphragm, associated with the weight of the movable contact-piece 14 and of the connection 16, is inserted between the bottom of the metal cap 9 and the support 15. Said spring 18 urges thus the diaphragm carried by the latter against the plate 7, as shown in FIG. 2, as long as the level of liquid inside the tank lies above a predetermined minimum level for which the weight of the float is balanced by the liquid.

In addition to the plate 7, the diaphragm 8 and the cap 9, there are secured to the skirt 4 of the switch body 2 leaf spring contact members 19, which removably secures the plug or switch body 2 within the filling port 3 of the gasoline tank and which ground the cup 9 through the tank wall.

The fluidtightness of the closure is ensured by engagement between the edge 3 of the filling port and an annular packing or gasket 21 housed inside a groove formed in the lower surface laterally extending flange portion of the skirt 4.

A signal lamp 22 is located at a position where it will be readily observed by the operator of the motorcycle. The lamp 22 is connected by a conductor 23 to the terminal nuts 12 and thence through the screw 10 to the stationary contact plate 7. The circuit of lamp 22 and conductor 23 is energized by a battery 24, one terminal of which is grounded through the body of the motorcycle to the gasoline tank and its port 3. The movable contact 14 is grounded to the port 3 through the support 15, the compression spring 18, the cup 9 and leaf spring contact members 19. This grounding is effected as soon as either of the leaf spring members 19 touches the outer edge of the lip of port 3. Thus, any sparking will occur in the open atmosphere and not within the interior of the port 3 or its associated gasoline tank where an explosive air-fuel mixture may be present.

In operation, when the fuel level within the gasoline tank sinks to a predetermined value where the connecting rod 16 supports the float 17 instead of its buoyancy, the weight of the float 17 urges movable contact 14 downwardly against the yielding action of the spring 18. When the movable contact 14 engages the stationary contact 7, as shown in FIG. 3, the signal lamp 22 is lighted. Sparking associated with opening or closing the circuit, controlled by contacts 14 and 7, takes place within the fluidtight compartment formed by the enclosed cylindrical space 5 from which gasoline fumes are excluded by the diaphragm 8.

The bottom of the cup 9 has a central aperture 25 formed therein through which the connecting rod 16 is freely slidable. The aperture 25 serves as a guide which maintains the connecting rod 16 in axial alignment with the support 15 even though the connecting rod 16 is not vertical.

It will be apparent to those skilled in the art that various changes and modifications may be made in the preferred embodiment of the invention which has been shown and described without departing from the spirit and scope of the invention as defined in the appended claims.

What I claim is:

1. A float switch comprising an electrically insulative plug-shaped body portion, said body portion being adapted for closure of a gasoline tank having a filling port portion by insertion of said body portion in said port portion; an electrically conductive cup member secured to the lower end of said body portion, a yielding, electrically insulative flexible diaphragm secured in a fluidtight manner between said body portion and said cup member; means defining a fluidtight chamber within said body portion, said chamber being closed by said diaphragm; a stationary contact member located within said chamber; movable contact means extending through said diaphragm in a fluidtight manner for engagement with said stationary contact member; a connecting rod having one end connected to said movable contact means, said connecting rod extending freely slidably through said cup member; a float connected to the other end of said connecting rod, said float being dimensioned for free passage through said filling port; electrically conductive spring means within said cup member yieldingly urging said movable contact means out of engagement with said stationary contact member, said cup member maintaining said connecting rod in axial alignment with said movable contact means when the position of the longitudinal axis of said connecting rod is displaced from the vertical; and a signaling circuit comprising said stationary contact member, said movable contact means, said spring means and said cup member, said signaling circuit being selectively opened or closed by vertical displacement of said float.

2. A float switch according to claim 1, further comprising at least one electrically conductive spring contact member carried by and connected to said cup member, said spring contact member being included in said signaling circuit, said spring contact member removably holding said body portion in said port portion by yielding engagement with said tank, said tank being grounded for inclusion in said signaling circuit, said spring contact member making and breaking contact, respectively, with said tank as said body portion is inserted and removed from said port portion, said making and breaking occurring in the free atmosphere at the outermost part of said port portion exteriorly of said tank.

3. A float switch comprising: an electrically insulative body member including a depending skirt portion defining a fluid tight cylindrical chamber which is open at one end; a flexible electrically insulative diaphragm in fluidtight engagement with said skirt portion, said diaphragm forming a fluidtight closure for said open end of said chamber; a centrally apertured annular stationary contact member mounted within said chamber adjacent to said diaphragm concentrically with respect to said chamber; a movable contact member extending through said diaphragm in fluidtight engagement therewith, said movable contact member being guided by said diphragm for displacement axially of said chamber, said movable contact member being spaced from the edge of the central aperture in said stationary contact member, said movable contact member comprising two axially spaced flange portions of greater diameter than the diameter of said central aperture, one of said flange portions being located within said chamber for circuit closing engagement with said stationary contact member upon outward movement of said movable contact member with respect to said chamber, the other of said flange portions being located exteriorly of said chamber in engagement with said diaphragm, said last-named flange portion backing up said diaphragm for limiting inward movement thereof with respect to said chamber when said diaphragm engages said stationary contact member; and float means connected to said movable contact member for causing displacement thereof.

4. A float switch according to claim 3, wherein said body member is adapted to serve as a closure cap for the filling mouth of an electrically conductive fuel tank, said body member further comprising a laterally extending flange portion provided with gasket means for sealing engagement with the lip of said mouth; said switch further comprising an electrically conductive supporting member connected to said body member; a first electrically conductive spring means carried by said supporting member and yieldingly urging said movable contact member inwardly of said chamber by electrically conductive engagement therewith; and second electrically conductive spring means carried by said supporting member, said second spring means being electrically connected to said movable contact member through said first spring means, said second spring means laterally electrically conductively engaging said mouth inwardly of said lip to simultaneously hold said gasket means in sealing engagement therewith and establish an electrical circuit from said movable contact member to said fuel tank, the dimensions of said float means permitting said float means to pass freely through said mouth for removal of said float switch from said tank.

5. A float switch according to claim 3, wherein said movable contact member comprises two threadedly interconnected portions each comprising one of said flange portions.

References Cited by the Examiner

UNITED STATES PATENTS

| 1,704,761 | 3/29 | Plant | 200—84 |
| 1,829,489 | 10/31 | Mularkey | 73—313 X |
| 2,684,414 | 7/54 | Kirkpatrick | 340—244 X |
| 2,777,030 | 1/57 | MacGriff et al. | 340—244 X |
| 2,804,517 | 8/57 | Ferry | 200—84 |
| 2,894,092 | 7/59 | MacGriff et al. | 200—84 |
| 2,899,517 | 8/59 | Hastings et al. | 200—84 |

BERNARD A. GILHEANY, *Primary Examiner.*

BENNETT G. MILLER, *Examiner.*